United States Patent
Wang et al.

(10) Patent No.: US 11,704,418 B2
(45) Date of Patent: Jul. 18, 2023

(54) FINGERPRINT ENCRYPTION METHOD AND DEVICE, FINGERPRINT DECRYPTION METHOD AND DEVICE, STORAGE MEDIUM AND TERMINAL

(71) Applicant: Shanghai Harvest Intelligence Technology Co., Ltd., Shanghai (CN)

(72) Inventors: Fei Wang, Shanghai (CN); Xueke Hu, Shanghai (CN); Tianyang Wang, Shanghai (CN); Sheng Feng, Shanghai (CN); Fengjun Gu, Shanghai (CN); Jiandong Huang, Shanghai (CN)

(73) Assignee: Shanghai Harvest Intelligence Technology Co., Ltd., Shanghai (CN)

( * ) Notice: Subject to any disclaimer, the term of this patent is extended or adjusted under 35 U.S.C. 154(b) by 542 days.

(21) Appl. No.: 16/696,555

(22) Filed: Nov. 26, 2019

(65) Prior Publication Data
US 2020/0167492 A1    May 28, 2020

(30) Foreign Application Priority Data

Nov. 27, 2018   (CN) .......................... 201811425256.1
Nov. 27, 2018   (CN) .......................... 201811429723.8

(51) Int. Cl.
*G06F 21/62*   (2013.01)
*G06F 21/60*   (2013.01)
(Continued)

(52) U.S. Cl.
CPC .......... *G06F 21/6209* (2013.01); *G06F 21/32* (2013.01); *G06F 21/602* (2013.01);
(Continued)

(58) Field of Classification Search
CPC .... G06F 21/6209; G06F 21/602; G06F 21/32; G06K 9/001; G06K 9/0008
See application file for complete search history.

(56) References Cited

U.S. PATENT DOCUMENTS 6,625,642 B1 *  9/2003  Naylor ............... H04N 1/00209
                                                709/200
6,938,028 B1 *  8/2005  Ito ........................... G06F 16/50
(Continued)

FOREIGN PATENT DOCUMENTS

CN        101540823 A      9/2009
CN        103020504 A      4/2013
(Continued)

OTHER PUBLICATIONS

First Chinese Office Action regarding Application No. 201811425256.1 dated Jun. 25, 2021. English translation provided by Unitalen Attorneys at Law.
(Continued)

*Primary Examiner* — Vance M Little
(74) *Attorney, Agent, or Firm* — Harness, Dickey & Pierce, P.L.C.

(57) ABSTRACT

Fingerprint encryption method and device, fingerprint decryption method and device, storage medium and terminal are provided. The fingerprint encryption method includes: acquiring a fingerprint image; dividing the fingerprint image into a plurality of block images according to a preset window, wherein a size of the block image is the same with a size of the preset window; determining identifiers of the plurality of block images, wherein the identifiers of the plurality of block images have a first preset order; and determining, according to the identifiers of the plurality of block images and a received encryption order, a plurality of encrypted block images to obtain an encrypted fingerprint image. Security of fingerprint storage or fingerprint transmission is enhanced.

15 Claims, 5 Drawing Sheets

(51) Int. Cl.
G06F 21/32 (2013.01)
G06V 40/12 (2022.01)

(52) U.S. Cl.
CPC ...... G06V 40/1359 (2022.01); G06V 40/1376 (2022.01); G06F 2221/2107 (2013.01)

(56) References Cited

U.S. PATENT DOCUMENTS

| | | | |
|---|---|---|---|
| 8,843,756 | B2 | 9/2014 | Takahashi et al. |
| 2001/0025342 | A1* | 9/2001 | Uchida ................. H04L 9/3231 713/186 |
| 2002/0174345 | A1* | 11/2002 | Patel ................... H04L 9/3231 713/186 |
| 2003/0039382 | A1* | 2/2003 | Yau .................... G06V 40/1359 382/125 |
| 2005/0175225 | A1* | 8/2005 | Shinzaki ............. G06V 40/1359 382/124 |
| 2006/0165264 | A1* | 7/2006 | Saitoh .................... G06V 10/50 382/115 |
| 2007/0133889 | A1* | 6/2007 | Horie ..................... H04N 19/86 375/E7.199 |
| 2008/0279380 | A1* | 11/2008 | Hayashi .................. H04L 9/088 380/243 |
| 2008/0298596 | A1* | 12/2008 | Kuraki ..................... G09C 5/00 380/283 |
| 2009/0257586 | A1 | 10/2009 | Takahashi et al. |
| 2015/0304321 | A1 | 10/2015 | Wong et al. |
| 2020/0106600 | A1* | 4/2020 | Dreifus ............. G06V 40/1376 |

FOREIGN PATENT DOCUMENTS

| | | |
|---|---|---|
| CN | 104680474 A | 6/2015 |
| CN | 106354385 A | 1/2017 |
| CN | 107231240 A | 10/2017 |
| CN | 107563949 A | 1/2018 |

OTHER PUBLICATIONS

Li, Chuan mu et al., "An Image Blocking Encryption Arithmetic Based on Chaotic Sequences," Computer Technology and Development, vol. 17, No. 8; Aug. 2007; pp. 51-54.

First Chinese Office Action regarding Application No. 201811429723.8 dated Dec. 1, 2021, English translation provided by Unitalen Attorneys at Law.

* cited by examiner

FINGERPRINT ENCRYPTION METHOD AND DEVICE, FINGERPRINT DECRYPTION METHOD AND DEVICE, STORAGE MEDIUM AND TERMINAL

CROSS-REFERENCE TO RELATED APPLICATIONS

The present application claims priority to Chinese patent application No. 201811429723.8, filed on Nov. 27, 2018, and Chinese patent application No. 201811425256.1, filed on Nov. 27, 2018, and the entire disclosures of which are incorporated herein by reference.

TECHNICAL FIELD

The present disclosure generally relates to an image processing technology field, and more particularly, to a fingerprint encryption method and device, a fingerprint decryption method and device, a storage medium and a terminal.

BACKGROUND

Fingerprint can be used to verify an identity of a user in more and more security verification fields due to its uniqueness.

In existing techniques, a fingerprint of a user is acquired in advance by a sensor, and corresponding fingerprint information is stored. When the fingerprint of the user is acquired again, the acquired fingerprint is compared with the stored fingerprint to verify whether an identity of the user.

However, the fingerprint information is easily stolen or intercepted during storage or transmission, which reduces security of fingerprint storage or fingerprint transmission.

SUMMARY

By embodiments of the present disclosure, security of fingerprint storage or fingerprint transmission may be enhanced.

In an embodiment of the present disclosure, a fingerprint encryption method is provided, including: acquiring a fingerprint image; dividing the fingerprint image into a plurality of block images according to a preset window, wherein a size of each of the plurality of block images is the same with a size of the preset window; determining identifiers of the plurality of block images, wherein the identifiers of the plurality of block images have a first preset order; and determining, according to the identifiers of the plurality of block images and a received encryption order, a plurality of encrypted block images to obtain an encrypted fingerprint image.

Optionally, the plurality of encrypted block images are arranged according to the encryption order which includes randomly arranged identifiers of the plurality of block images and is different from the first preset order.

Optionally, the fingerprint encryption method further includes: receiving an encryption password from a server, wherein the encryption password indicates the encryption order.

Optionally, the fingerprint encryption method further includes: transmitting the encrypted fingerprint image to the server.

Optionally, before acquiring the fingerprint image, the fingerprint encryption method further includes: receiving a fingerprint capturing request, and capturing a fingerprint in response to the fingerprint capturing request to acquire the fingerprint image.

Optionally, the preset window includes a plurality of sub-windows, and dividing the fingerprint image into a plurality of block images according to a preset window includes: dividing the fingerprint image into the plurality of block images according to the size of the preset window; and for each of the plurality of block images, dividing the block image into a plurality of sub-block images according to a corresponding sub-window, wherein identifiers of the plurality of sub-block images have a second preset sequence.

Optionally, the encryption order includes a first encryption order and a second encryption order, and determining, according to the identifiers of the plurality of block images and a received encryption order, a plurality of encrypted block images includes: determining, according to the identifiers of the plurality of block images and the first encryption order, the plurality of block images arranged in the first encryption order; and for each of the plurality of block images, determining, according to the identifiers of the plurality of sub-block images and the second encryption order, a plurality of encrypted sub-block images arranged in the second encryption order, to obtain the plurality of encrypted block images.

Optionally, the sub-window occupies M×M pixels, and the preset window occupies (M×N)×(M×N) pixels, where M is a positive integer greater than or equal to 4, and N is a positive integer greater than or equal to 4.

Optionally, the preset window occupies P×P pixels, where P is a positive integer greater than or equal to 16.

Optionally, the identifiers of the plurality of block images are selected from a group consisting of numeric numbers and character numbers.

In an embodiment of the present disclosure, a fingerprint decryption method is provided, including: determining an encryption password; receiving an encrypted fingerprint image, wherein the encrypted fingerprint image includes a plurality of encrypted block images arranged in an encryption order indicated by the encryption password; determining a first preset order, wherein identifiers of the plurality of block images before encryption have the first preset order; and determining, according to the identifiers of the plurality of block images before encryption, the encryption order indicated by the encryption password, and the first preset order, a plurality of decrypted block images to obtain a decrypted fingerprint image, wherein identifiers of the plurality of decrypted block images have the first preset order.

Optionally, the encryption order includes a first encryption order and a second encryption order, each of the plurality of block images before encryption includes a plurality of sub-block images whose identifiers have a second preset order, identifiers of the plurality of encrypted sub-block images have the second encryption order, and determining, according to the identifiers of the plurality of block images before encryption, the encryption order indicated by the encryption password, and the first preset order, a plurality of decrypted block images includes: determining, according to the first encryption order and the first preset order, the plurality of block images arranged in the first preset order; and for each block image, determining, according to the second encryption order and the second preset order, a plurality of sub-block images arranged in the second preset order.

In an embodiment of the present disclosure, a fingerprint encryption device is provided, including: a fingerprint image capturing circuitry configured to capture a fingerprint image;

a division circuitry configured to divide the fingerprint image into a plurality of block images according to a preset window, wherein a size of each of the plurality of block images is the same with a size of the preset window; an identifier determination circuitry configured to determine identifiers of the plurality of block images, wherein the identifiers of the plurality of block images have a first preset order; and an encryption circuitry configured to determine, according to the identifiers of the plurality of block images and a received encryption order, a plurality of encrypted block images to obtain an encrypted fingerprint image.

Optionally, the plurality of encrypted block images are arranged according to the encryption order which includes randomly arranged identifiers of the plurality of block images and is different from the first preset order.

Optionally, the fingerprint encryption device further includes an encryption password reception circuitry configured to receive an encryption password from a server, wherein the encryption password indicates the encryption order.

Optionally, the fingerprint encryption device further includes a transmission circuitry configured to transmit the encrypted fingerprint image to the server.

Optionally, the preset window includes a plurality of sub-windows, and the division circuitry includes: a block image division circuitry configured to divide the fingerprint image into the plurality of block images according to the size of the preset window; and a sub-block image division circuitry configured to: for each of the plurality of block images, divide the block image into a plurality of sub-block images according to a corresponding sub-window, wherein identifiers of the plurality of sub-block images have a second preset sequence.

Optionally, the encryption order includes a first encryption order and a second encryption order, and the encryption circuitry includes: a block image encryption circuitry configured to determine, according to the identifiers of the plurality of block images and the first encryption order, the plurality of block images arranged in the first encryption order; and a sub-block image encryption circuitry configured to: for each of the plurality of block images, determine, according to the identifiers of the plurality of sub-block images and the second encryption order, a plurality of encrypted sub-block images arranged in the second encryption order, to obtain the plurality of encrypted block images.

Optionally, the sub-window occupies M×M pixels, and the preset window occupies (M×N)×(M×N) pixels, where M is a positive integer greater than or equal to 4, and N is a positive integer greater than or equal to 4.

Optionally, the preset window occupies P×P pixels, where P is a positive integer greater than or equal to 16.

Optionally, the identifiers of the plurality of block images are selected from a group consisting of numeric numbers and character numbers.

In an embodiment of the present disclosure, a fingerprint decryption device is provided, including: an encryption password determination circuitry configured to determine an encryption password; an encrypted fingerprint reception circuitry configured to receive an encrypted fingerprint image, wherein the encrypted fingerprint image includes a plurality of encrypted block images arranged in an encryption order indicated by the encryption password; an order determination circuitry configured to determine a first preset order, wherein identifiers of the plurality of block images before encryption have the first preset order; and a decryption circuitry configured to determine, according to the identifiers of the plurality of block images before encryption, the encryption order indicated by the encryption password, and the first preset order, a plurality of decrypted block images to obtain a decrypted fingerprint image, wherein identifiers of the plurality of decrypted block images have the first preset order.

In an embodiment of the present disclosure, a storage medium having computer instructions stored therein is provided, where once the computer instructions are executed, the above fingerprint encryption or fingerprint decryption method is performed.

In an embodiment of the present disclosure, a terminal including a memory and a processor is provided, wherein the memory has computer instructions stored therein, and when the processor executes the computer instructions, the above fingerprint encryption or fingerprint decryption method is performed.

Embodiments of the present disclosure may provide following advantages.

In embodiments of the present disclosure, a fingerprint image is acquired. The fingerprint image is divided into a plurality of block images according to a preset window, wherein a size of each of the plurality of block images is the same with a size of the preset window. Identifiers of the plurality of block images are determined, wherein the identifiers of the plurality of block images have a first preset order. According to the identifiers of the plurality of block images and a received encryption order, a plurality of encrypted block images are determined to obtain an encrypted fingerprint image, wherein the plurality of encrypted block images are arranged according to the encryption order which includes randomly arranged identifiers of the plurality of block images and is different from the first preset order. In embodiments of the present disclosure, the fingerprint image is divided into the plurality of block images whose identifiers have the first preset order. Fingerprint information of the fingerprint image includes arrangement of a plurality of types of fingerprint ridges and is irregular. Therefore, by rearranging the block images according to the encryption order, the encrypted fingerprint image is acquired so as to avoid abuse of the fingerprint image after being intercepted or stolen, which may enhance security of fingerprint storage and fingerprint transmission.

Further, the fingerprint encryption method further includes receiving an encryption password indicating the encryption order from a server, and transmitting the encrypted fingerprint image to the server. As the transmitted fingerprint image is encrypted, it is more difficult to restore the encrypted fingerprint image, which further avoids the abuse of the fingerprint image after being intercepted or stolen and guarantees the security of fingerprint transmission.

Further, the plurality of block images arranged in the first encryption order are determined according to the identifiers of the plurality of block images and the first encryption order. For each of the plurality of block images, a plurality of encrypted sub-block images arranged in the second encryption order are determined according to the identifiers of the plurality of sub-block images and the second encryption order, so as to obtain the plurality of encrypted block images. By rearranging the sub-block images in each block image according to the second encryption order and rearranging the block images in the fingerprint image according to the first encryption order, the double encryption mode is adopted to further guarantee security of fingerprint encryption, which may enhance the security of fingerprint storage and fingerprint transmission.

DETAILED DESCRIPTION

As described in the background, fingerprint information is easily stolen or intercepted during storage or transmission, which reduces security of fingerprint storage and fingerprint transmission.

In embodiments of the present disclosure, a fingerprint image is acquired. The fingerprint image is divided into a plurality of block images according to a preset window, wherein a size of each of the plurality of block images is the same with a size of the preset window. Identifiers of the plurality of block images are determined, wherein the identifiers of the plurality of block images have a first preset order. According to the identifiers of the plurality of block images and a received encryption order, a plurality of encrypted block images are determined to obtain an encrypted fingerprint image, wherein the plurality of encrypted block images are arranged according to the encryption order which includes randomly arranged identifiers of the plurality of block images and is different from the first preset order. In embodiments of the present disclosure, the fingerprint image is divided into the plurality of block images whose identifiers have the first preset order. Fingerprint information of the fingerprint image includes arrangement of a plurality of types of fingerprint ridges and is irregular. Therefore, by rearranging the block images according to the encryption order, the encrypted fingerprint image is acquired so as to avoid abuse of the fingerprint image after being intercepted or stolen, which may enhance security of fingerprint storage and fingerprint transmission.

In order to clarify the object, solutions and advantages of embodiments of the present disclosure, embodiments of present disclosure will be described clearly in detail in conjunction with accompanying drawings.

Figure 1:
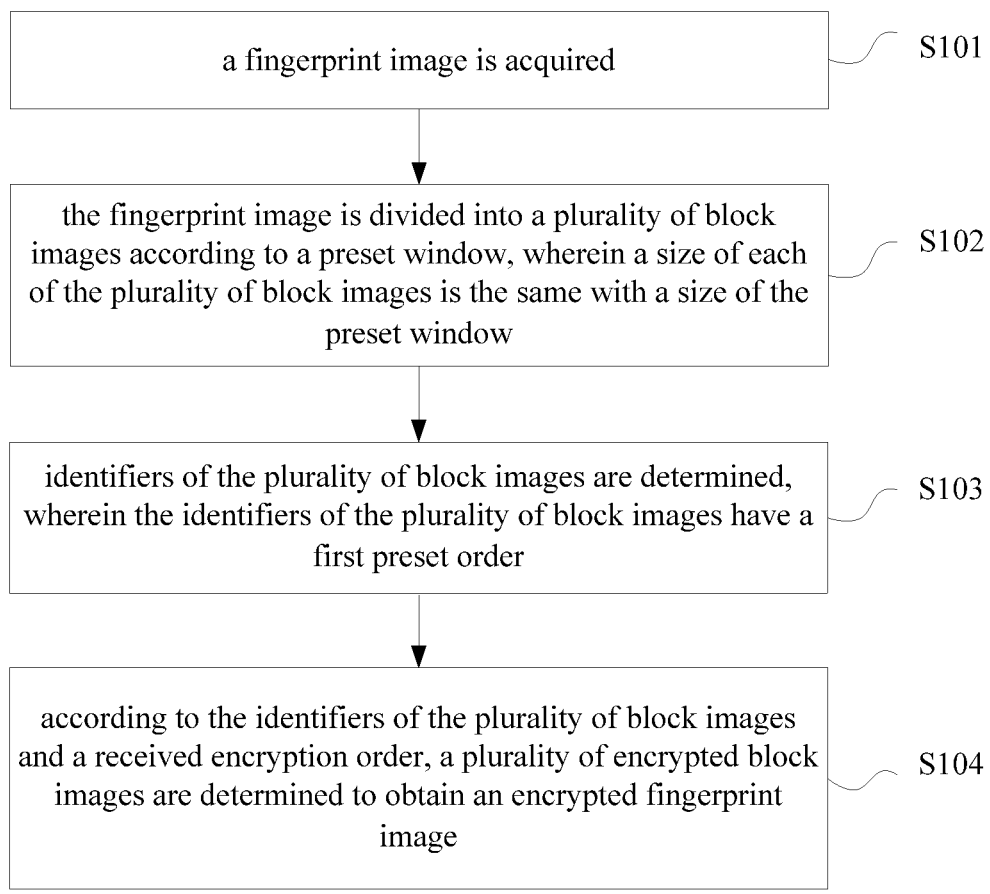
FIG. 1 schematically illustrates a flow chart of a fingerprint encryption method according to an embodiment.

Referring to FIG. 1, FIG. 1 schematically illustrates a flow chart of a fingerprint encryption method according to an embodiment. The method includes S101, S102, S103 and S104.

In S101, a fingerprint image is acquired.

In S102, the fingerprint image is divided into a plurality of block images according to a preset window, wherein a size of each of the plurality of block images is the same with a size of the preset window.

In S103, identifiers of the plurality of block images are determined, wherein the identifiers of the plurality of block images have a first preset order.

In S104, according to the identifiers of the plurality of block images and a received encryption order, a plurality of encrypted block images are determined to obtain an encrypted fingerprint image. The plurality of encrypted block images are arranged according to the encryption order which includes randomly arranged identifiers of the plurality of block images and is different from the first preset order.

It should be noted that, sequence numbers of the steps do not limit a performing order of the steps.

The fingerprint encryption method provided in the embodiment may be applied in a terminal device.

In some embodiments, in S101, the fingerprint image may be acquired from real-time capturing by a sensor, or from a database (for example, the fingerprint image may be pre-acquired and pre-stored in a database), or received from other terminal devices. The fingerprint image may refer to an image completely recording fingerprint information of a user.

In some embodiments, in S102, the larger the preset window is, the more fingerprint information is included in the block image, and the encrypted block images are more likely to be cracked. On the contrary, the smaller the preset window is, the greater the number of the block images is, and the larger the calculation amount of the encryption for the fingerprint image is. Therefore, the size of the preset window may be determined according to empirical values and practical application scenarios.

After the fingerprint image is divided, in some embodiments, in S103, the identifiers of the plurality of block images are determined. The identifiers of the plurality of block images have the first preset order.

In some embodiments, the first preset order is an order based on which the fingerprint image is divided. More specifically, the identifiers of the plurality of block images may be numerical numbers ordered from large to small or from small to large. For example, for the plurality of block images obtained after dividing the fingerprint image, the identifiers of the block images may be consecutive Arabic numerals arranged from large to small order in a row-major order.

Figure 2:
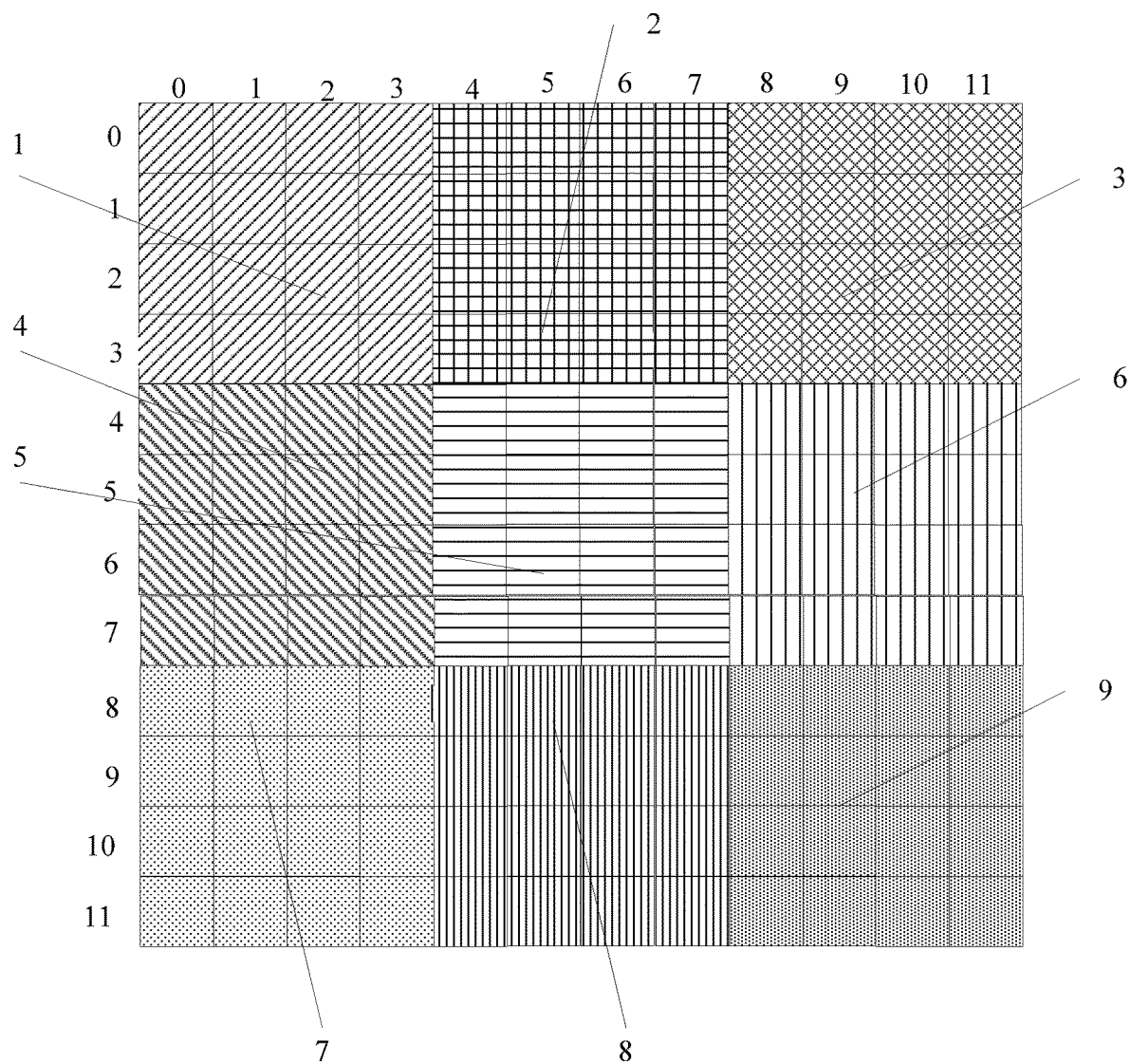
FIG. 2 schematically illustrates an arrangement of block images before encryption according to an embodiment.

Specifically, referring to FIG. 2, the fingerprint image occupies 12×12 pixels. The preset window occupies 4×4 pixels.

After the fingerprint image is divided by the preset window, nine block images having a size of 4×4 can be acquired, as shown with portions having different filling patterns in FIG. 2. Specifically, the nine block images obtained by the division have the identifiers arranged in the first preset order. For block images in rows 0 to 3, the identifiers are 1, 2 and 3 in a direction from column 0 to 11. Similarly, for block images in rows 4 to 7, the identifiers are 4, 5 and 6 in the direction from column 0 to 11. And for block images in rows 8 to 11, the identifiers are 7, 8 and 9 in the direction from column 0 to 11.

The identifiers of the nine block images have the first preset order, that is, the identifiers of the nine block images are arranged in the first predetermined order to form a sequence of 1, 2, 3, 4, 5, 6, 7, 8 and 9.

It should be noted that FIG. 2 is merely an exemplary illustration. The size of the fingerprint image and the size of the preset window may be adaptively set according to practical application scenarios, so that the number of block images obtained by the division depends upon the practical application scenarios, which is not limited in embodiments of the present disclosure.

In some embodiments, in S104, an arrangement order of the plurality of block images obtained by the division is changed, that is, an arrangement order of the identifiers of the plurality of encrypted block images is the received encryption order which is different from the first preset order.

In some embodiments, the fingerprint encryption method further includes: receiving an encryption password from a server, wherein the encryption password indicates the encryption order. That is, the encryption password may be generated by the server, where a generation rule of the encryption password may be preset by the server. For example, the server may generate the encryption password randomly.

In some embodiments, the number and the identifiers of the block images after the division may be agreed by the terminal device and the server in advance. For example, after the division, the number of the block images is 10, and the identifiers of the block images may include ten Arabic numerals of 0 to 9. The encryption password generated by the server may include ten Arabic numerals of 0 to 9 arranged randomly.

In some embodiments, the greater the number of the block images is, the longer and the more complex the encryption password is.

Accordingly, in some embodiments, in S104, the fingerprint image is encrypted according to the encryption password. That is, the arrangement order of the plurality of block images obtained by the division is changed, so that the arrangement order of the identifiers of the plurality of encrypted block images is the encryption order which is indicated by the encryption password and different from the first preset order.

Figure 3:
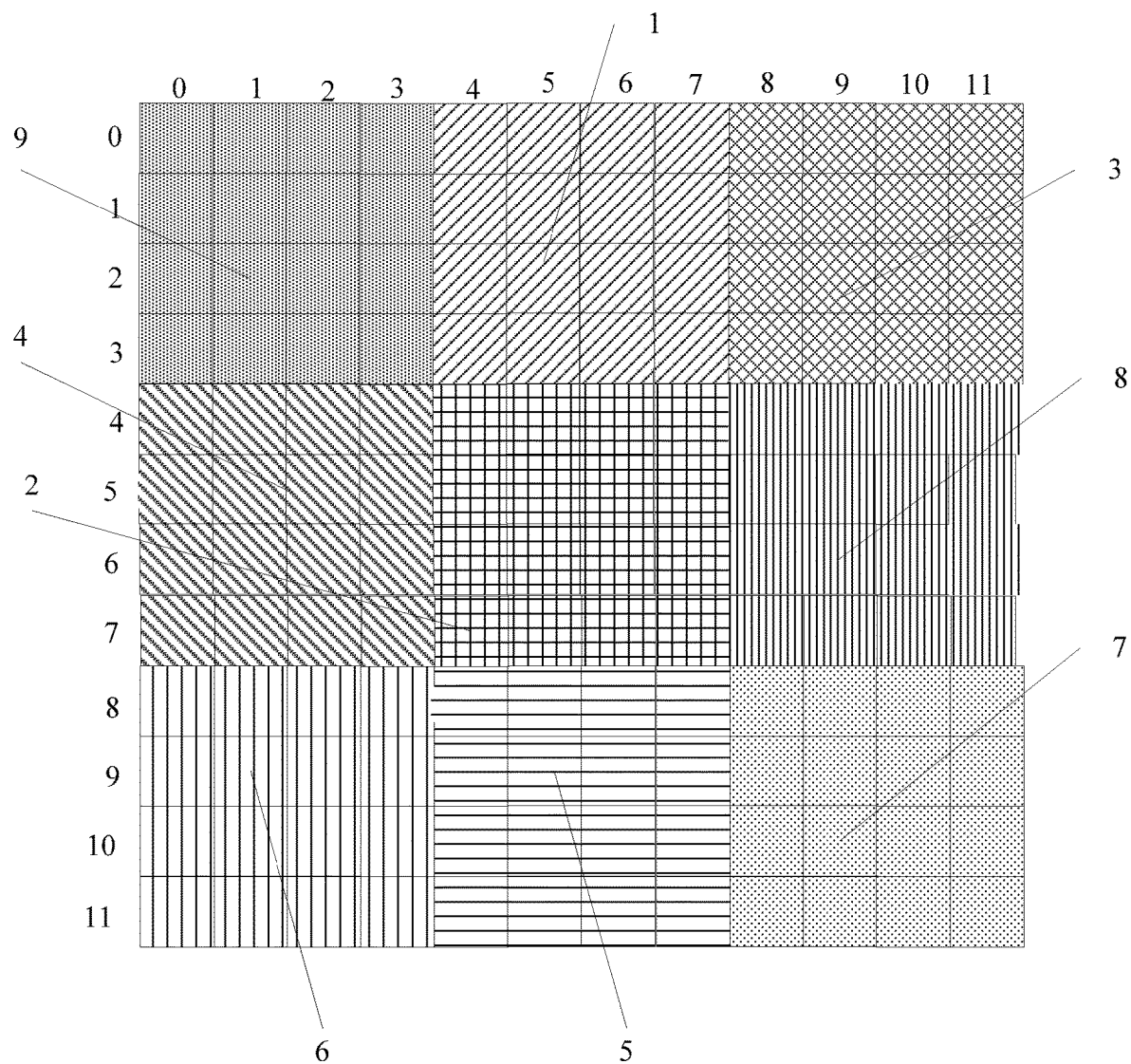
FIG. 3 schematically illustrates an arrangement of block images after encryption according to an embodiment.

Still referring to FIG. 2, the fingerprint image is divided into nine block images. By arranging identifiers of the nine block images according to the first preset order, a sequence of 1, 2, 3, 4, 5, 6, 7, 8 and 9 is formed. The encryption order is different from the first preset order, and may be, for example, (9, 1, 3, 4, 2, 8, 6, 5 and 7). Accordingly, the nine encrypted block images (as shown in FIG. 3) are arranged according to the encryption order (9, 1, 3, 4, 2, 8, 6, 5 and 7) to form the encrypted fingerprint image.

In some embodiments, the fingerprint encryption method further includes: transmitting the encrypted fingerprint image to the server.

In some embodiments, after receiving the encrypted fingerprint image, the server may store it to guarantee security of fingerprint storage. In some embodiments, the encrypted fingerprint image may be stored in a storage space under a Trusted Execution Environment (TEE), to further guarantee the security of fingerprint storage.

In the above embodiments, before transmission of the fingerprint image, the encryption password is received from the server. Afterward, the fingerprint image is divided into the plurality of block images whose identifiers have the first preset order. Fingerprint information of the fingerprint image includes arrangement of a plurality of types of fingerprint ridges and is irregular. Therefore, by rearranging the block images according to the encryption order, the encrypted fingerprint image is acquired. As the transmitted fingerprint image is encrypted, it is more difficult to restore the encrypted fingerprint image, so as to avoid abuse of the fingerprint image after being intercepted or stolen during the transmission, which may guarantee security of fingerprint storage and fingerprint transmission.

In some embodiments, before S101, the fingerprint encryption method further includes: receiving a fingerprint capturing request, and capturing a fingerprint in response to the fingerprint capturing request to acquire the fingerprint image.

In some embodiments, the terminal device may perform fingerprint capturing, i.e., initiating the above fingerprint encryption and transmission process, after receiving the fingerprint capturing request from the server.

It should be noted that, details of the fingerprint capturing may be referred to existing techniques and are not described in detail here.

Further, the encryption password may be received along with the fingerprint capturing request. In some embodiments, when sending the fingerprint capturing request, the server may also send the encryption password together, so that the terminal device can encrypt the captured fingerprint image.

In a typical application scenario of the present disclosure, a terminal device needs to conduct a transaction with a server. After the terminal device submits a transaction request to the server, the server sends a fingerprint capturing request to verify the identity of a user. Meanwhile, the server may also send an encryption password to the terminal device. The terminal device encrypts the captured fingerprint image using the encryption password, and transmits the encrypted fingerprint image to the server, which guarantees security of the fingerprint during the transmission, and reduces a risk of the fingerprint being intercepted, thereby ensuring security of the transaction. In addition, the server may issue different encryption passwords for different transaction requests of the terminal device at different times.

In some embodiments, the preset window occupies P×P pixels, where P is a positive integer greater than or equal to 16.

In some embodiments, if the fingerprint image is divided into the plurality of block images merely, the preset window may be set to occupy 16×16 pixels.

In some embodiments, the preset window includes a plurality of sub-windows. S102 as shown in FIG. 1 includes: dividing the fingerprint image into a plurality of block images according to the size of the preset window; and for each of the plurality of block images, dividing the block image into a plurality of sub-block images according to a corresponding sub-window, wherein identifiers of the plurality of sub-block images have a second preset sequence.

In some embodiments, each block image may be divided into a plurality of sub-block images. In some embodiments, the second preset order is an order based on which the block image is divided. More specifically, the identifiers of the plurality of sub-block images may be numerical numbers ordered from large to small or from small to large. For example, the identifiers of the sub-block images may be consecutive Arabic numerals arranged from large to small.

Figure 4:
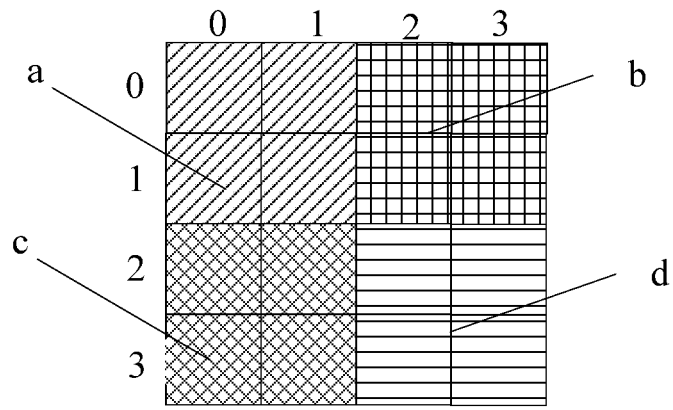
FIG. 4 schematically illustrates an arrangement of sub-block images according to an embodiment.

Specifically, referring to FIGS. 2 and 4, the preset window occupies 4×4 pixels, and the sub-window occupies 2×2 pixels.

For the block image with an identifier 1, the block image may be divided into four sub-block images according to the size of the sub-window, including a sub-block image with an identifier a, a sub-block image with an identifier b, a sub-block image with an identifier c, and the sub-block image with an identifier d.

The identifiers of the four sub-block images have a second preset order, that is, a sequence of the four sub-block images are arranged in the second preset order, and a sequence of a, b, c and d is formed by arranging the identifiers of the four sub-block images according to the second preset order.

In some embodiments, the encryption order includes a first encryption order and a second encryption order, and S104 as shown in FIG. 1 includes: determining, according to the identifiers of the plurality of block images and the first encryption order, the plurality of block images arranged in the first encryption order; and for each of the plurality of block images, determining, according to the identifiers of the plurality of sub-block images and the second encryption order, a plurality of encrypted sub-block images arranged in the second encryption order, to obtain the plurality of encrypted block images.

In some embodiments, for different block images, different second encryption orders may be adopted to determine the plurality of encrypted sub-block images. That is, the encryption order may include a single first encryption order and a plurality of second encryption orders, where the number of the plurality of second encryption orders is the same as the number of the plurality of block images.

In some embodiments, the greater the number of the sub-block images is, the longer the second encryption order is, and the more complex the encryption password is. For example, if the number of the block images after the division is 200, and the number of the sub-block images in each block image is 49, the available number of the first encryption order indicated by the encryption password is a factorial of 200, the available number of the second encryption order indicated by the encryption password is a factorial of 49, and the total available number of the encryption password is a product of the factorial of 200 and the factorial of 49. Therefore, complexity of the encryption password is increased, and accordingly, complexity of decryption is increased, which guarantees security of the encrypted fingerprint image.

In the above embodiments, by rearranging the sub-block images in each block image according to the second encryption order and rearranging the block images in the fingerprint image according to the first encryption order, the double encryption mode is adopted to further guarantee security of fingerprint encryption, which may enhance the security of fingerprint storage and fingerprint transmission.

It should be noted that, for the encrypted fingerprint image, each sub-block image may be restored according to the second preset order, and each block image may be restored according to the first preset order.

In some embodiments, the sub-window occupies M×M pixels, and the preset window occupies (M×N)×(M×N) pixels, where M is a positive integer greater than or equal to 4, and N is a positive integer greater than or equal to 4.

In some embodiments, the identifiers of the plurality of block images are selected from a group consisting of numeric numbers and character numbers.

Figure 5:
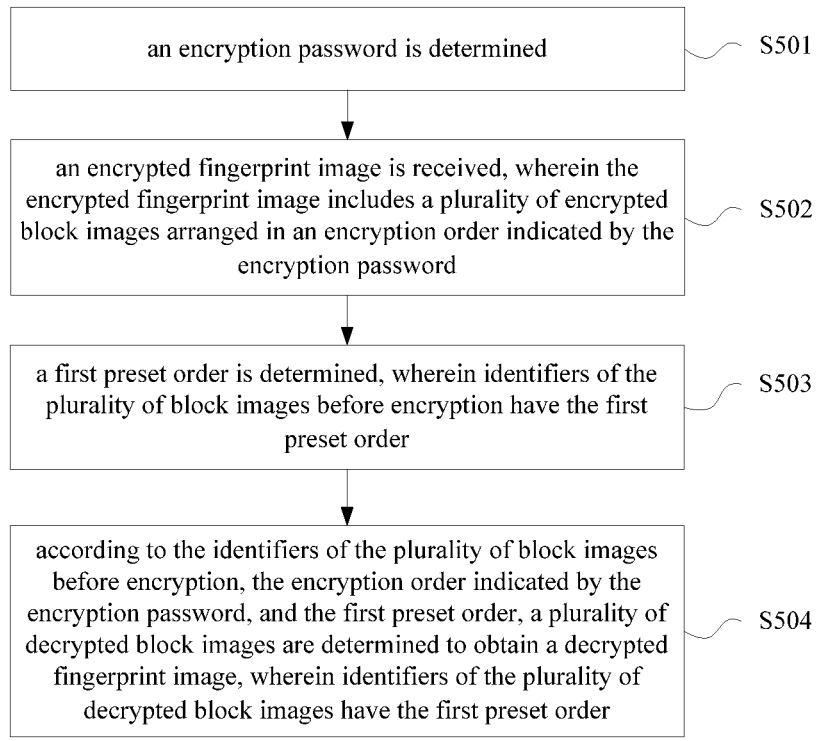
FIG. 5 schematically illustrates a flow chart of a fingerprint decryption method according to an embodiment.

Referring to FIG. 5, in an embodiment, a fingerprint decryption method is provided. The fingerprint decryption method includes S501, S502, S503 and S504.

In S501, an encryption password is determined.

In S502, an encrypted fingerprint image is received, wherein the encrypted fingerprint image includes a plurality of encrypted block images arranged in an encryption order indicated by the encryption password.

In S503, a first preset order is determined, wherein identifiers of the plurality of block images before encryption have the first preset order.

In S504, according to the identifiers of the plurality of block images before encryption, the encryption order indicated by the encryption password, and the first preset order, a plurality of decrypted block images are determined to obtain a decrypted fingerprint image, wherein identifiers of the plurality of decrypted block images have the first preset order.

In some embodiments, the fingerprint decryption method may be applied in a server.

In some embodiments, decryption of the encrypted fingerprint image is a process for restoring the plurality of encrypted block images to an arrangement order before encryption. That is, the plurality of encrypted block images are arranged according to the encryption order indicated by the encryption password, and the identifiers of the plurality of decrypted block images have the first preset order.

For a third-party device, the encryption order of the plurality of encrypted block images, the first preset order, and the identifiers of the block images are all unknown, thus, security of the encrypted fingerprint image is relatively high.

In some embodiments, the encryption order includes a first encryption order and a second encryption order, each of the plurality of block images before encryption includes a plurality of sub-block images whose identifiers have a second preset order, identifiers of the plurality of encrypted sub-block images have the second encryption order, and S504 as shown in FIG. 5 includes: determining, according to the first encryption order and the first preset order, the plurality of block images arranged in the first preset order; and for each block image, determining, according to the second encryption order and the second preset order, a plurality of sub-block images arranged in the second preset order.

In the above embodiments, as each block image is divided into a plurality of sub-block image which are also encrypted, the double encryption guarantees transmission security of the fingerprint image. In addition, during the decryption, for each block image, the plurality of encrypted sub-block images are also decrypted according to the second encryption order and the second preset order to restore each block image.

More details about the fingerprint decryption method may be referred to the descriptions of the foregoing embodiments of the fingerprint encryption method, and are not described in detail here.

Figure 6:
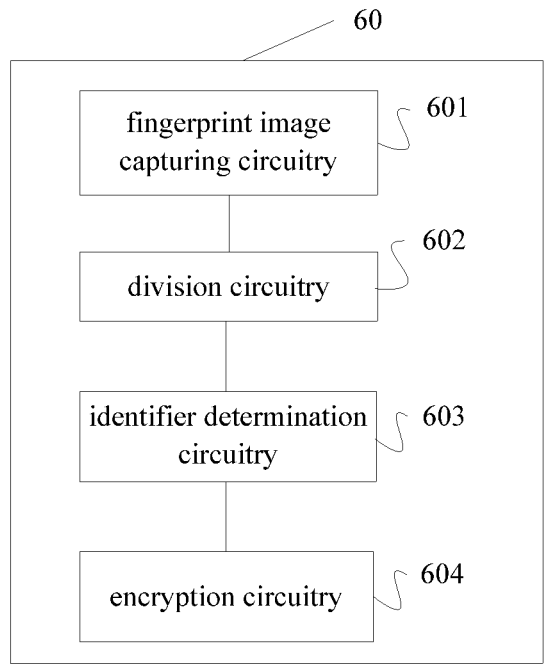
FIG. 6 schematically illustrates a block diagram of a fingerprint encryption device according to an embodiment.

Referring to FIG. 6, in an embodiment, a fingerprint encryption device is provided. The fingerprint encryption device 60 includes a fingerprint image capturing circuitry 601, a division circuitry 602, an identifier determination circuitry 603 and an encryption circuitry 604.

The fingerprint image capturing circuitry 601 is configured to capture a fingerprint image. The division circuitry 602 is configured to divide the fingerprint image into a plurality of block images according to a preset window, wherein a size of each of the plurality of block images is the same with a size of the preset window. The identifier determination circuitry 603 is configured to determine identifiers of the plurality of block images, wherein the identifiers of the plurality of block images have a first preset order. The encryption circuitry 604 is configured to determine, according to the identifiers of the plurality of block images and a received encryption order, a plurality of encrypted block images to obtain an encrypted fingerprint image, wherein the plurality of encrypted block images are arranged according to the encryption order which includes randomly arranged identifiers of the plurality of block images and is different from the first preset order.

In the above embodiments, the fingerprint image is divided into the plurality of block images whose identifiers have the first preset order. Fingerprint information of the fingerprint image includes arrangement of a plurality of types of fingerprint ridges and is irregular. Therefore, by rearranging the block images according to the encryption order, the encrypted fingerprint image is acquired so as to avoid abuse of the fingerprint image after being intercepted or stolen, which may enhance security of fingerprint storage and fingerprint transmission.

In some embodiments, the fingerprint encryption device 60 further includes an encryption password reception circuitry configured to receive an encryption password from a server, wherein the encryption password indicates the encryption order.

In some embodiments, the fingerprint encryption device 60 further includes a transmission circuitry configured to transmit the encrypted fingerprint image to the server.

In some embodiments, the preset window includes a plurality of sub-windows. The division circuitry 602 as shown in FIG. 6 includes a block image division circuitry and a sub-block image division circuitry. The block image division circuitry is configured to divide the fingerprint image into a plurality of block images according to the size of the preset window. The sub-block image division circuitry is configured to: for each of the plurality of block images, divide the block image into a plurality of sub-block images according to a corresponding sub-window, wherein identifiers of the plurality of sub-block images have a second preset sequence.

In some embodiments, the encryption order includes a first encryption order and a second encryption order. The encryption circuitry 604 as shown in FIG. 6 includes a block image encryption circuitry and a sub-block image encryption circuitry. The block image encryption circuitry is configured to determine, according to the identifiers of the plurality of block images and the first encryption order, the plurality of block images arranged in the first encryption order. The sub-block image encryption circuitry is configured to: for each of the plurality of block images, determine, according to the identifiers of the plurality of sub-block images and the second encryption order, a plurality of encrypted sub-block images arranged in the second encryption order, to obtain the plurality of encrypted block images.

More details about working principles and modes of the fingerprint encryption device 60 may be referred to the descriptions of the foregoing embodiments as shown in FIGS. 1 to 4, and are not described in detail here.

Figure 7:
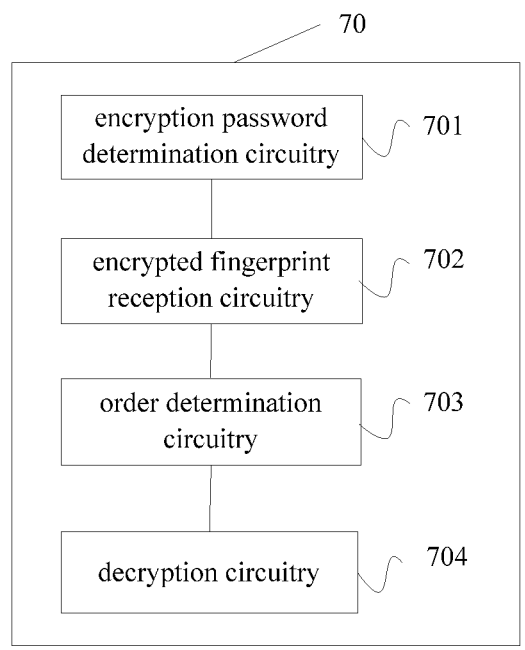
FIG. 7 schematically illustrates a block diagram of a fingerprint decryption device according to an embodiment.

Referring to FIG. 7, in an embodiment, a fingerprint decryption device is provided. The fingerprint decryption device 70 includes an encryption password determination circuitry 701, an encrypted fingerprint reception circuitry 702, an order determination circuitry 703 and a decryption circuitry 704.

The encryption password determination circuitry 701 is configured to determine an encryption password. The encrypted fingerprint reception circuitry 702 is configured to receive an encrypted fingerprint image, wherein the encrypted fingerprint image includes a plurality of encrypted block images arranged in an encryption order indicated by the encryption password. The order determination circuitry 703 is configured to determine a first preset order, wherein identifiers of the plurality of block images before encryption have the first preset order. The decryption circuitry 704 is configured to determine, according to the identifiers of the plurality of block images before encryption, the encryption order indicated by the encryption password, and the first preset order, a plurality of decrypted block images to obtain a decrypted fingerprint image, wherein identifiers of the plurality of decrypted block images have the first preset order.

More details about working principles and modes of the fingerprint decryption device 70 may be referred to the descriptions of the foregoing embodiments as shown in FIGS. 1 to 5, and are not described in detail here.

In an embodiment of the present disclosure, a storage medium having computer instructions stored therein is provided, where once the computer instructions are executed, the method as shown in FIG. 1 or 5 is performed. The storage medium may be a Read-Only Memory (ROM), a Random Access Memory (RAM), a magnetic disk or an optical disk. The storage medium may be a non-volatile memory or a non-transitory memory.

In an embodiment of the present disclosure, a terminal including a memory and a processor is provided, wherein the memory has computer instructions stored therein, and when the processor executes the computer instructions, the method as shown in FIG. 1 or 5 is performed. The terminal may include but is not limited to a terminal device, such as a mobile phone, a computer or a tablet.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A fingerprint encryption method, comprising:
acquiring a fingerprint image;
dividing the fingerprint image into a plurality of block images according to a preset window, wherein a size of each of the plurality of block images is the same with a size of the preset window;
determining identifiers of the plurality of block images, wherein the identifiers of the plurality of block images have a first preset order; and
determining, according to the identifiers of the plurality of block images and a received encryption order, a plurality of encrypted block images to obtain an encrypted fingerprint image,
wherein the preset window comprises a plurality of sub-windows, and dividing the fingerprint image into a plurality of block images according to a preset window comprises: dividing the fingerprint image into the plurality of block images according to the size of the preset window; and for each of the plurality of block images, dividing the block image into a plurality of sub-block images according to a corresponding sub-window, wherein identifiers of the plurality of sub-block images have a second preset sequence; and
wherein the encryption order comprises a first encryption order and a second encryption order, and determining, according to the identifiers of the plurality of block images and a received encryption order, a plurality of encrypted block images comprises: determining, according to the identifiers of the plurality of block images and the first encryption order, the plurality of block images arranged in the first encryption order; and for each of the plurality of block images, determining, according to the identifiers of the plurality of sub-block images and the second encryption order, a plurality of encrypted sub-block images arranged in the second encryption order, to obtain the plurality of encrypted block images.

2. The fingerprint encryption method according to claim 1, wherein the plurality of encrypted block images are arranged according to the encryption order which comprises randomly arranged identifiers of the plurality of block images and is different from the first preset order.

3. The fingerprint encryption method according to claim 1, wherein before acquiring the fingerprint image, the method further comprises:

receiving a fingerprint capturing request, and capturing a fingerprint in response to the fingerprint capturing request to acquire the fingerprint image.

4. The fingerprint encryption method according to claim 1, wherein the sub-window occupies M×M pixels, and the preset window occupies (M×N)×(M×N) pixels, where M is a positive integer greater than or equal to 4, and N is a positive integer greater than or equal to 4.

5. The fingerprint encryption method according to claim 1, wherein the preset window occupies P×P pixels, where P is a positive integer greater than or equal to 16.

6. The fingerprint encryption method according to claim 1, wherein the identifiers of the plurality of block images are selected from a group consisting of numeric numbers and character numbers.

7. The fingerprint encryption method according to claim 1, further comprising: receiving from a server an encryption password which indicates the encryption order.

8. The fingerprint encryption method according to claim 7, further comprising: transmitting the encrypted fingerprint image to the server.

9. A fingerprint encryption device, comprising:

a fingerprint image capturing circuitry configured to capture a fingerprint image;

a division circuitry configured to divide the fingerprint image into a plurality of block images according to a preset window, wherein a size of each of the plurality of block images is the same with a size of the preset window;

an identifier determination circuitry configured to determine identifiers of the plurality of block images, wherein the identifiers of the plurality of block images have a first preset order; and an encryption circuitry configured to determine, according to the identifiers of the plurality of block images and a received encryption order, a plurality of encrypted block images to obtain an encrypted fingerprint image, wherein the preset window comprises a plurality of sub-windows, and the division circuitry comprises: a block image division circuitry configured to divide the fingerprint image into the plurality of block images according to the size of the preset window; and a sub-block image division circuitry configured to: for each of the plurality of block images, divide the block image into a plurality of sub-block images according to a corresponding sub-window, wherein identifiers of the plurality of sub-block images have a second preset sequence; and wherein the encryption order comprises a first encryption order and a second encryption order, and the encryption circuitry comprises: a block image encryption circuitry configured to determine, according to the identifiers of the plurality of block images and the first encryption order, the plurality of block images arranged in the first encryption order; and a sub-block image encryption circuitry configured to: for each of the plurality of block images, determine, according to the identifiers of the plurality of sub-block images and the second encryption order, a plurality of encrypted sub-block images arranged in the second encryption order, to obtain the plurality of encrypted block images.

10. The fingerprint encryption device according to claim 9, wherein the plurality of encrypted block images is arranged according to the encryption order which comprises randomly arranged identifiers of the plurality of block images and is different from the first preset order.

11. The fingerprint encryption device according to claim 9, wherein the sub-window occupies M×M pixels, and the preset window occupies (M×N)×(M×N) pixels, where M is a positive integer greater than or equal to 4, and N is a positive integer greater than or equal to 4.

12. The fingerprint encryption device according to claim 9, wherein the preset window occupies P×P pixels, where P is a positive integer greater than or equal to 16.

13. The fingerprint encryption device according to claim 9, wherein the identifiers of the plurality of block images are selected from a group consisting of numeric numbers and character numbers.

14. The fingerprint encryption device according to claim 9, further comprising an encryption password reception circuitry configured to receive from a server an encryption password which indicates the encryption order.

15. The fingerprint encryption device according to claim 14, further comprising a transmission circuitry configured to transmit the encrypted fingerprint image to the server.

* * * * *